United States Patent
Ueda et al.

(10) Patent No.: US 8,254,757 B2
(45) Date of Patent: Aug. 28, 2012

(54) INFORMATION PROCESSING APPARATUS AND DATA PROCESSING METHOD AND PROGRAM

(75) Inventors: Kenjiro Ueda, Kanagawa (JP); Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 539 days.

(21) Appl. No.: 12/486,173

(22) Filed: Jun. 17, 2009

(65) Prior Publication Data
US 2009/0324196 A1    Dec. 31, 2009

(30) Foreign Application Priority Data
Jun. 27, 2008 (JP) .................................. 2008-169278

(51) Int. Cl.
*H04N 9/80* (2006.01)
(52) U.S. Cl. ........................................ 386/257
(58) Field of Classification Search ........................ None
See application file for complete search history.

(56) References Cited

U.S. PATENT DOCUMENTS

| | | | |
|---|---|---|---|
| 2003/0051021 A1* | 3/2003 | Hirschfeld et al. | 709/223 |
| 2006/0095700 A1* | 5/2006 | Sato et al. | 711/165 |
| 2006/0227975 A1 | 10/2006 | Ueda et al. | |
| 2008/0005523 A1* | 1/2008 | Hassan | 711/170 |
| 2008/0313270 A1* | 12/2008 | Clinick et al. | 709/203 |
| 2009/0094284 A1 | 4/2009 | Ueda et al. | |
| 2009/0094321 A1 | 4/2009 | Ueda et al. | |
| 2009/0328227 A1* | 12/2009 | Cook et al. | 726/26 |

OTHER PUBLICATIONS

U.S. Appl. No. 13/338,946, filed Dec. 28, 2011, Ueda, et al.

* cited by examiner

*Primary Examiner* — William C Vaughn, Jr.
*Assistant Examiner* — Eileen Adams
(74) *Attorney, Agent, or Firm* — Oblon, Spivak, McClelland, Maier & Neustadt, L.L.P.

(57) ABSTRACT

Disclosed herein is an information processing apparatus including: a first data processing block configured by a virtual machine as a virtual hardware environment for executing a program read from a first recording media recording content and the program for executing data processing; and a second data processing block configured to execute data conversion of the content and copy processing of the converted content onto a second recording media. The first data processing block executes acquisition of copy permission information from a management server by execution of the program and shuts down the virtual machine after completion of the acquisition of the copy permission information. The second data processing block is configured to execute data conversion of content recorded to the first recording media and copy processing of the converted content onto a second recording media after the virtual machine is shut down.

12 Claims, 9 Drawing Sheets

| | API BETWEEN BD-J APPLICATION AND AACS LAYER |
|---|---|
| (1) | generateOfferRequestInfo()<br>· INPUT: NONE<br>· OUTPUT: mcmNonce (RANDOM NUMBER), SERIAL NUMBER (PMSN FOR EXAMPLE)<br>· EXPLANATION: API FOR REQUESTING AACS LAYER FOR GENERATING DATA NECESSARY FOR OFFER REQUEST |
| (2) | verifyOffer(offer)<br>· INPUT: OFFER(PRODUCT LIST)<br>· OUTPUT: OK/NG(RESULT OF VARIFICATION)<br>· EXPLANATION: API FOR VERIFYING AN OFFER TRANSMITTED FROM THE SERVER VERIFICATION WORK IS EXECUTED ON AACS LAYER ENSURED WITH SECURITY. IF VERIFICATION IS SUCCESSFUL, SESSION ID IS HELD |
| (3) | setMCU(MCUi)<br>· INPUT: MANAGED COPY UNIT NUMBER(PRODUCT NUMBER AND VALUE INFORMATION, ETC.)<br>· OUTPUT: OK/NG(RESULT OF HOLDING ON THE PLAYER SIDE)<br>· EXPLANATION: API FOR ANOTHER BD-J APPLICATION(CHARGE APPLICATION FOR EXAMPLE) TO REFERENCE MCUi SELECTED BY THE USER |

FIG. 3B

| | API BETWEEN BD-J APPLICATION AND AACS LAYER |
|---|---|
| (4) | getMCU() <br> · INPUT: NONE <br> · OUTPUT: MCUi <br> · EXPLANATION: API FOR REFERENCING MCUi HELD BY ANOTHER BD-J APPLICATION (EXAMPLE: APPLICATION FOR DISPLAYING OFFER). |
| (5) | generatePermissionRequestInfo() <br> · INPUT: NONE <br> · OUTPUT: MCUi, SESSION ID, MCM_MCOTInfo (INFORMATION UNIQUE TO COPY DISTINATION; OPTIONAL) <br> · EXPLANATION: API FOR REQUESTING AACS LAYER TO GENERATE DATA NECESSARY FOR PERMISSION REQUEST |
| (6) | verifyPermission(permission) <br> · INPUT: PERMISSION (PERMISSION INFORMATION) <br> · OUTPUT: OK/NG (RESULT OF VERIFICATION) <br> · EXPLANATION: API FOR VERIFYING THE PERMISSION TRANSMITTED FROM THE SERVER. VERIFICATION WORK IS EXECUTED ON THE AACS LAYER ENSURED WITH SECURITY. IF THE VERIFICATION IS SUCCESSFUL, BD-J VM MAY BE SHUT DOWN. THEN, COPY IS STARTED. |

INFORMATION PROCESSING APPARATUS AND DATA PROCESSING METHOD AND PROGRAM

BACKGROUND OF THE INVENTION

1. Field of the Invention

The present invention relates to an information processing apparatus and a data processing method and a program. To be more specific, the present invention relates to an information processing apparatus and a data processing method and a program that are configured to execute content recording processing and copy processing on recording media.

2. Description of the Related Art

For recording media for recording various kinds of content, such as music and video, the DVD (Digital Versatile Disc, the Blu-ray Disc (registered trademark) are in a wide use. These information recording media include media that are recorded with data beforehand and does not allow new data writing (ROM type) and media that allow data writing (R type, RE type, etc.), for example. Use of data-writing enabled information recording media allows content recorded to one media to be copied or moved to another media. Further, for example, it is practicable to download content through networks or devices installed in public spaces and record the downloaded content.

Recording media for recording content may also include hard disk drives and flash memories, for example, in addition to the above-mentioned DVDs and Blu-ray Discs (registered trademark).

The processing modes in which content is recorded to recording media include the following, for example:

(a) copying or moving content from a media (a ROM disc for example) already recorded content;

(b) downloading and recording content from servers; and (c) recording content through terminals installed in stores or public spaces.

The above-mentioned processing is assumed, for example.

It should be noted here that many kinds of content, such as music data, image data, and so on, are protected in copyright and distribution, for example. Therefore, it is a general practice that, in providing content to users, content is provided to those users who are granted with certain use restrictions, namely, legal use rights, thereby preventing illegal manipulation of content, for example.

For example, AACS (Advanced Access Content System) is known as a standard associated with the use control of content. According to the AACS standard, the execution of content copy between media as described in processing mode (a) above requires the acquisition of copy permission information from a management server. Namely, under predetermined management, the copy of content is permitted. This copy processing is referred to as managed copy (MC).

The content providing mode of (b) above, namely, the download-type content providing processing is also referred to as EST (Electric Sell Through). The content providing mode of (c) above based on the use of shared terminal is referred to as MoD (Manufacturing on Demand). The AACS standard also requires these content providing modes to comply with predetermined rules.

Figure 1A:
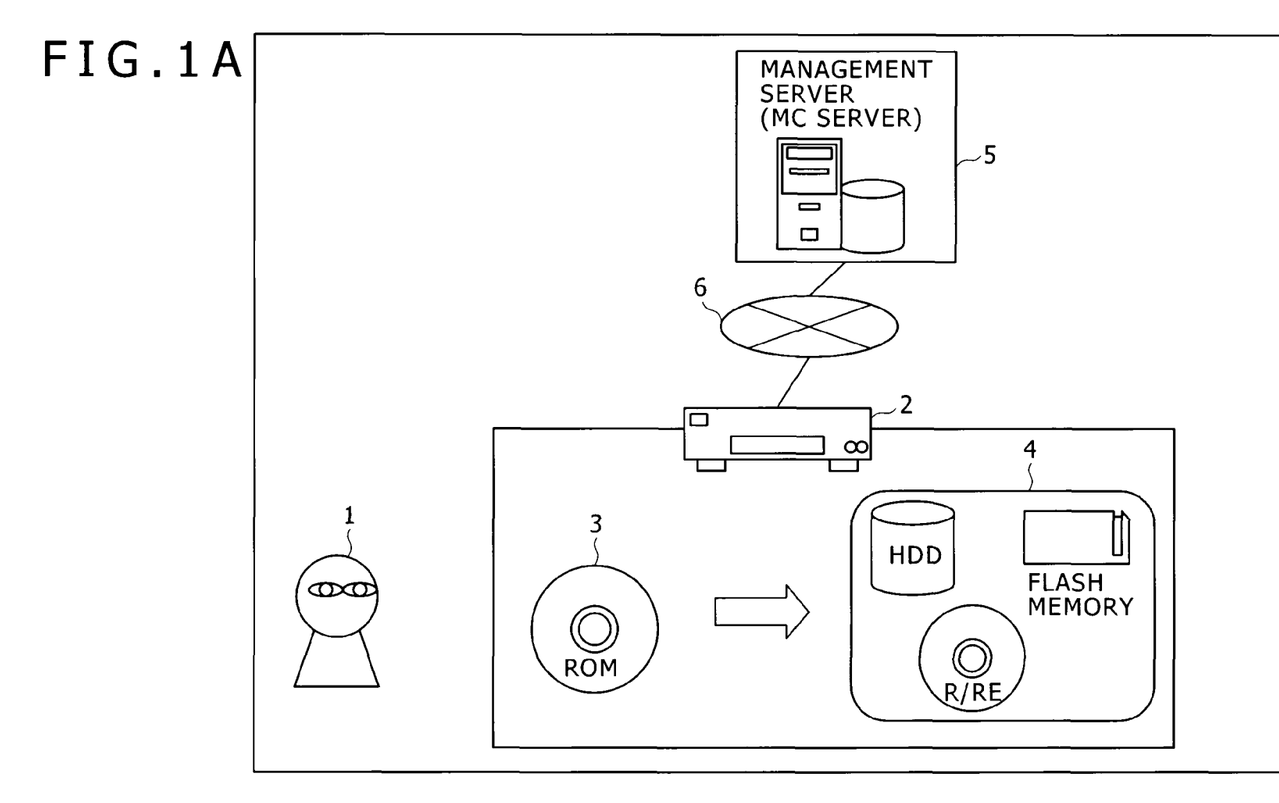
FIG. 1A shows a schematic diagram illustrating an example of Managed Copy that is content copy between information recording media to be executed under predetermined management.
Figure 1B:
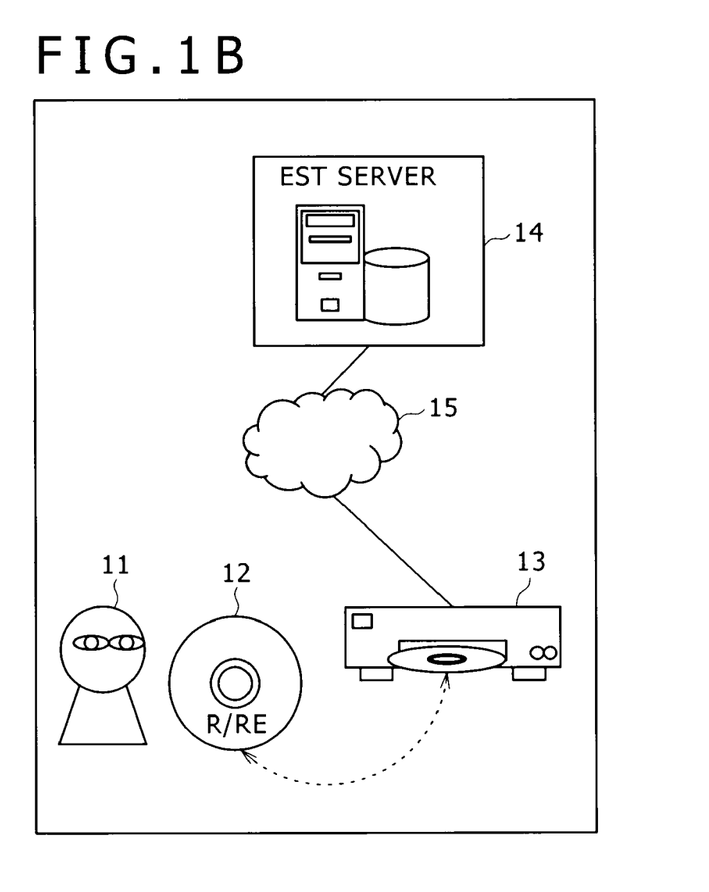
FIG. 1B shows a schematic diagram illustrating Electric Sell Through that is processing of downloading content from a server and FIG. 1C shows a schematic diagram illustrating Manufacturing on Demand that is content providing processing by use of a shared terminal.
Figure 1C:
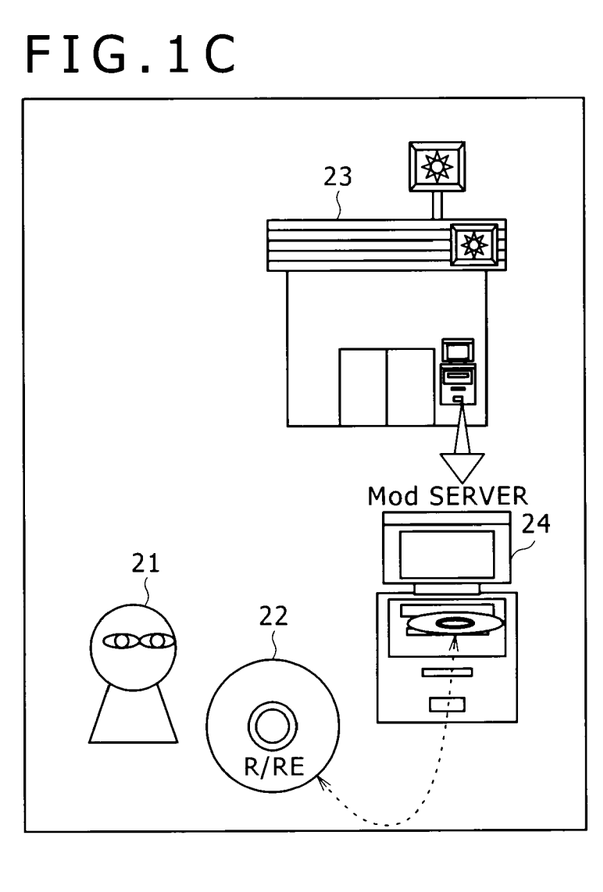

The following describes the overview of the following three processing modes with reference to FIGS. 1A to 1C.

(a) MC
(b) EST
(c) MoD
(a) MC

Managed copy denotes a processing operation in which user 1 sets an information recording media (disc) 3 recorded with content beforehand onto an information processing apparatus 2 for executing data recording and reproduction processing and copies content from the information recording media 3 to a second information recording media 4, such as a data-writing enabled R/RE disc of R type or RE type, or a hard disk drive or a flash memory, and the like, as shown in FIG. 1A, for example.

In executing this content copy processing, the information processing apparatus 2 must connect to a management server 5 via a network 6 to get the permission of content copy from the management server 5.

It should be noted that FIG. 1A shows one information processing apparatus, namely, a configuration in which content copy processing between two or more media is executed by a single unit of apparatus; it is also practicable to provide an apparatus loaded with a copy source media and an apparatus loaded with a copy destination media, which are interconnected with a USB cable for example.

(b) EST

A processing operation in which content is downloaded from a server and the downloaded content is recorded to information recording media is referred to as EST. As shown in FIG. 1B, EST is a processing operation in which a media, for example, a disc 12 of R type or RE type that enables data writing, is loaded on an information processing unit 13 such as a PC of the user 1 and content is received from a content server (EST server) 14 via a network 15 to be recorded to the loaded media.

(c) MoD

The content providing processing of shared terminal use type is referred to as MoD. As shown in FIG. 1C, in MoD, a user 21 records content to a media by use of a content server 24 that is a terminal installed in a public space, such as a convenience store or a railroad station, and purchases the copied content. Namely, the user 21 sets his disc 22 of R type or RE type enabled for data writing onto the content server (MoD server) 24 that is a terminal of a convenience store 23 and writes desired content to the disc 22 by executing a content selecting operation, for example.

It should be noted that the above-mentioned processing configurations (a) through (c) are described in Patent Document 1 (Japanese Patent Laid-Open No. Hei 2008-98765), for example.

As described above, the user is able to record content to data recordable media to use (or reproduce for example) the recorded data. However, if the content is copy-protected for example, it may be necessary to control the use of content to prevent unconditional usage.

As described above, AACS is known as a standard associated with content copy protection technologies. The AACS standard specifies usage control information (or usage rules) corresponding to content to employ a control configuration for executing the content usage compliant with the usage rules. Further, strict usage control is realized by dividing a piece of content into units to provide the encrypted content with unit keys applied to these units, the unit keys being obtained by a particular user.

If the disc to which content has been recorded is a media that allows reproduction of the content and does not allow new recording of content, for example, a ROM disc, no new additional recording or editing of content is executed on the disc, so that the content-unique usage rules and the unit keys corresponding to media-recorded content can be provided to the user as recorded to the media.

However, in the mode where content is recorded to a disc of R type or RE type, a hard disk drive, or a flash memory, for example, and the recorded content is used, the recorded content is not fixed, so that update operations such as recording of new contents and deletion of recorded contents are supported. In accordance with the updating of media stored content as described above, the processing of updating usage control information and unit keys may be required.

When the user records content to media, complicated processings, such as the recording of various auxiliary data corresponding to the recorded content may be required, in addition to the recording of content. Therefore, for example, if the above-mentioned managed copy is executed, it is a general practice to executing the copy processing by using a program specified a series of processing sequences in advance.

For example, a program (or a player application) for executing the above-mentioned managed copy is stored in each information processing apparatus compliant with the AACS standard. In order to execute the managed copy by use of a device compliant with AACS, the user executes the player application stored in that device. When this program is executed, a sequence of processing operations, such as the connection with the management server and the acquisition of copy permission information from the management server, are executed and then content copy processing is executed under the condition of the acquisition of copy permission information.

In copying content recorded to a Blu-ray Disc (registered trademark), managed copy is executed by invoking the player application stored in an AACS compliant device. For a method of invoking this player application, any one of the following methods is admitted in AACS:

(a) invoking from a menu presented on the UI of the device; and (b) invoking by first invoking BD-J (Blue-ray Disc Java (registered trademark)) application program that is a Java program (registered trademark) stored in the disc with content recorded, thereby invoking the player application via the BD-J application.

AACS specifies to execute one of the above-mentioned methods (a) and (b).

The player application is a program stored in the device for executing content reproduction and recording and created as a program for common use to various kinds of content. On the other hand, the BD-J application is recordable on discs and can be set unique to content corresponding to disc-recorded content. Namely, this is a program that can be created by a content creator in accordance with disc-recorded content.

Namely, the BD-J application is a program that can be created by the content creating side to a certain degree of freedom, thereby allowing various settings in accordance with various content configurations. Therefore, setting such that managed copy is executed by applying the BD-J application also allows the content creator to execute content-unique processing for example in accordance with content configurations and the like.

However, the execution of managed copy may require the processing corresponding to the AACS-specified programs, such as the processing of converting the content data stored in the copy source into a format in accordance with the media of the copy destination and setting an AACS-specified directory such that the reproduction of the media of the copy destination can be executed in accordance with the AACS rules. The execution of these processing operations may require the processing on the execution layer (or the AACS layer) of each AACS-specified managed program.

Therefore, if the BD-J application is set as a managed copy execution program, at least a part of the processing must be executed on the AACS layer.

As described above, in order to execute managed copy, the processing in two data processing blocks, the BD-J application and the AACS layer, has to be executed in the information processing apparatus. However, the information processing apparatus is limited in resource. For example, the memory size of the information processing apparatus is limited.

In the AACS layer, content data stored in the copy source is converted into the format according to the media of the copy destination. However, if a memory area large enough is not allocated for this processing, this processing takes a long time.

The BD-J application is a Java (registered trademark) application program and executes processing by setting a virtual machine as a virtual hardware environment for executing Java (registered trademark) applications. This processing uses a large memory area in the information processing apparatus.

Therefore, if the processing operations in the two data processing blocks, the BD-J application and the AACS layer, are executed at the same time, the limited memory space in the information processing apparatus is used by both the AACS layer and the BD-J application to possibly lead to the insufficient allocation of the memory space required by both the data processing blocks, thereby delaying the processing of each data processing block and protracting the processing time.

SUMMARY OF THE INVENTION

Therefore, the present invention addresses the above-identified and other problems associated with related-art methods and apparatuses and solves the addressed problems by providing an information processing apparatus and a data processing method and a program that are configured, in executing a sequence of processing involved in the content copy processing between media to be executed under the control of a server, to efficiently use the resources of an information processing apparatus by defining a proper processing sequence, thereby realizing high-speed processing without causing delay.

In carrying out the invention and according to a first embodiment thereof, there is provided an information processing apparatus including a first data processing block configured by a virtual machine as a virtual hardware environment for executing a program read from a first recording media recording content and the program for executing data processing and a second data processing block configured to execute data conversion of the content and copy processing of the converted content onto a second recording media. The first data processing block executes acquisition of copy permission information from a management server by execution of the program and shuts down the virtual machine after completion of the acquisition of the copy permission information. The second data processing block is configured to execute data conversion of content recorded to the first recording media and copy processing of the converted content onto a second recording media after the virtual machine is shut down.

In the above-mentioned information processing apparatus, the first data processing block frees a memory area of the information processing apparatus before shutting down the virtual machine and the second data processing block executes data conversion of the content recorded to the first recording media and copy processing of the converted content onto the second recording media by use of the memory area of the information processing apparatus freed by the first data processing block.

In the above-mentioned information processing apparatus, the first data processing block executes data processing on a Java (registered trademark)—VM (Virtual Machine) that is a virtual machine as a virtual hardware environment for executing a Java (registered trademark) application program.

In the above-mentioned information processing apparatus, the first data processing block acquires data necessary for requesting copy permission information from the second data processing block and transmits the acquired data to the management server.

In the above-mentioned information processing apparatus, the first data processing block executes processing of requesting the second data processing block for verifying copy permission information acquired from the management server and, after receiving a response indicative of successful verification, shuts down the virtual machine.

In the above-mentioned information processing apparatus, the first data processing block requests the second data processing block for data necessary for requesting copy permission information.

In the above-mentioned information processing apparatus, the first data processing block requests the second data processing block for processing by applying an API (Application Programming Interface) defined with processing to be executed.

In carrying out the invention and according to a second embodiment thereof, there is provided an information recording media recording content and a program for data processing as recorded data, wherein the program is executed on a virtual machine as a virtual hardware environment in an information processing apparatus to shut down the virtual machine before data conversion or copy recording processing of the content to make a data processing block for executing data conversion or copy recording processing free a memory area in the information processing apparatus.

In the above-mentioned information recording media, the program is a Java (registered trademark) application program.

In carrying out the invention and according to a third embodiment thereof, there is provided a data processing method that is executed in an information processing apparatus. This data processing method has the steps of executing, by a first data processing block, a program read from a first recording media recording content and the program for executing data processing on a virtual machine as a virtual hardware environment for executing, acquiring copy permission information from a management server, and shutting down the virtual machine after completion of acquisition processing of the copy permission information and executing, by a second data processing block, data conversion of content recorded to the first recording media and copy processing of the converted content onto a second recording media after the virtual machine is shut down.

In carrying out the invention and according to a fourth embodiment thereof, there is provided a program for making an information processing apparatus execute data processing. This program has the steps of acquiring, in a virtual machine as a virtual hardware environment, copy permission information from a management server and shutting down the virtual machine after completion of acquisition of the copy permission information and executing, in a data processing block, after shutting down of the virtual machine, data conversion of content recorded to a first recording media and copy processing of the converted content onto a second recording media.

It should be noted that the program according to the present embodiment is a computer program that can be provided, in a storage media or via a communication media that are computer readable, for general-purpose computer systems configured to execute various program codes. By providing the program above in a computer readable manner, processing corresponding to the program is realized on computer systems.

Other objects, features, and advantages of the present invention will be clarified by detail description with reference to embodiments of the present invention and accompanying drawings. It should be noted that a system as referred to herein denotes a logical aggregation of two or more units of apparatuses and each component apparatus is not always accommodated in one housing.

According to the configurations of embodiments of the present invention, in executing the content copy processing between media in an information processing apparatus, processing sequences in a first data processing block for executing processing operations such as acquiring copy permission information from a server and a second data processing block for executing data conversion and copy recording processing involved in content copy processing are set with the use of resources of the information processing apparatus taken into consideration. To be more specific, after the completion of the processing in the first data processing block for executing processing operations such as acquiring copy permission information from a server, a virtual machine configuring the first data processing block is shut down to free a memory area and then data conversion and copy recording processing are started in the second data processing block. This novel setting allows the first data processing block and the second data processing block to allocate a memory area large enough for the execution of various data processing operations, thereby realizing efficient processing without causing delay.

DETAILED DESCRIPTION OF THE PREFERRED EMBODIMENTS

The following describes in detail an information processing apparatus and a data processing method and a program practiced as embodiments of the present invention with reference to the accompanying drawings.

Figure 2:
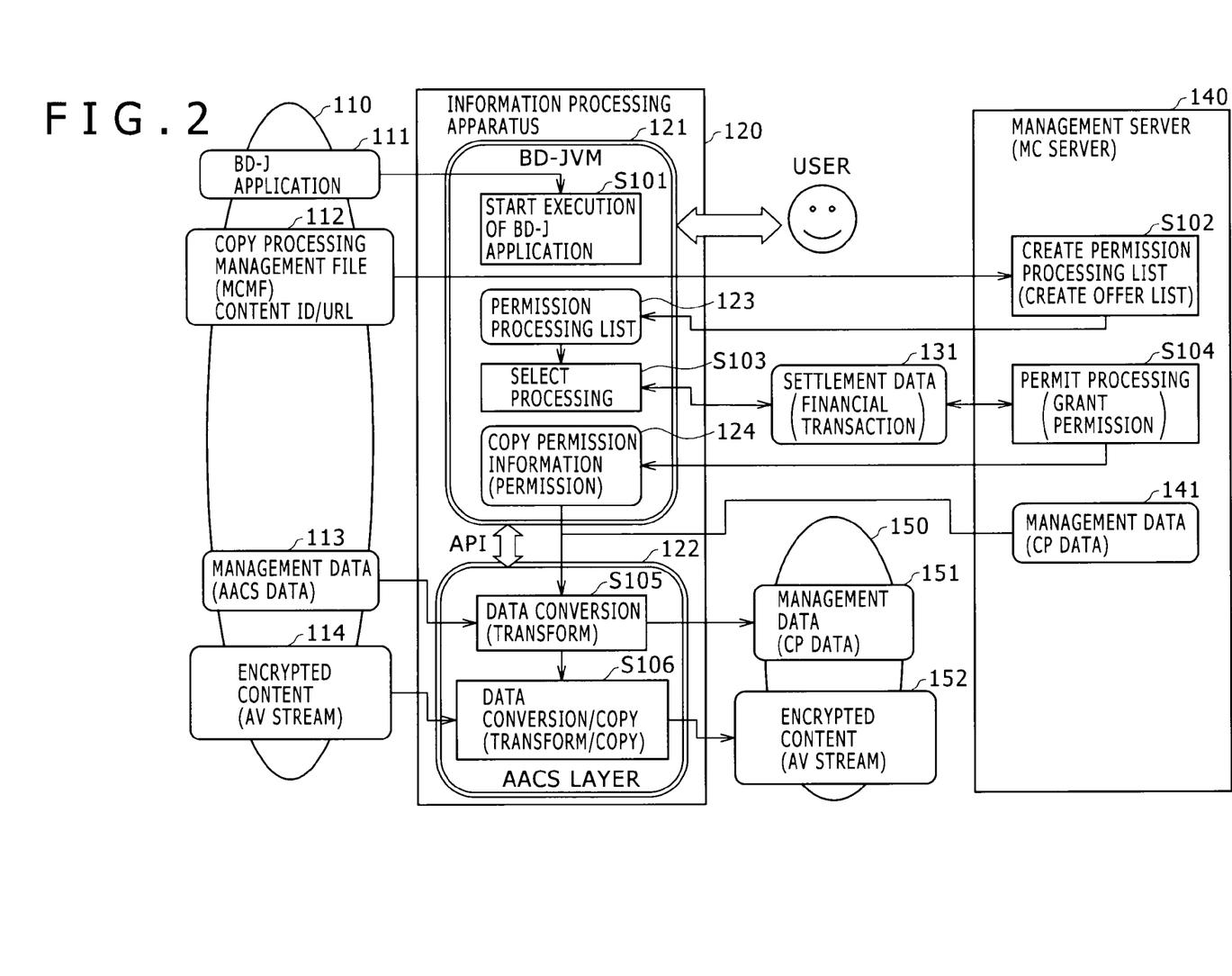
FIG. 2 shows a schematic diagram illustrating exemplary processing of content copy associated with one embodiment of the invention.

First, with reference to FIG. 2, a processing example of managed copy (MC: Managed Copy) to be executed by the information processing apparatus practiced as one embodiment of the present invention is described. As described above, managed copy is processing for copying content to another media under the condition that copy permission information is obtained from the management server.

FIG. 2 shows, from left to right, a disc 110 already recorded with content, an information processing apparatus 120 for reading content from the disc 110 and recording the content to a second information recording media 150 with data recording enabled, the second information recording media (media) 150 that is the copy destination of this content, and a management server 140 for executing the processing of providing content copy processing permission information and management data.

The disc 110 is a ROM disc or a Blu-ray Disc (registered trademark), for example.

The second information recording media 150 to which content is copied is a recording media, such as a hard disk drive, an R/RE disc, or a flash memory.

The information processing apparatus 120, configured by a PC or a recording/reproducing apparatus, for example, has capabilities of reading data from the disc 110 and recording the read data to the second information recording media 150.

As shown in the figure, the disc 110 stores a BD-J application 111 that is a Java (registered trademark) application program, a copy processing management file (MCMF) 112, management data 113, and encrypted content 114.

The BD-J application 111 is a program that is executed by the information processing apparatus 120 when content copy is executed; for example, the BD-J application 111 is a program to execute the processing, such as communication with the management server 140, for example. It should be noted that the BD-J application 111 may be configured as a single application program or a combination of two or more BD-J applications for executing a particular processing operation.

For example, the above-mentioned combination includes a BD-J application for executing communication with servers and a BD-J application dedicated to charging processing. In executing content copying, the plurality of BD-J applications is executed in the information processing apparatus 120.

The copy processing management file 112 is applied when executing content copy processing. For example, the copy processing management file 112 is an XML described data file containing the following information:

(a) content ID that is an identifier (ID) uniquely indicative of the content recorded to an information recording media (the disc 110);

(b) URI (URL) that is information for connecting to the management server 140 that executes the permission of copy for executing content copy and the generation of a token by bind processing, for example, that is access information for the management server 140; and (c) information about directory and file names that records the data for permitting copy processing of a directory name and/or a file name.

The management data 113 is specified by AACS (Advanced Access Content System) that is a standard management system associated with content copyright technologies for example and includes a CPS unit key file storing a key (a unit key) that is applied to the decryption of the encrypted content 114, usage control information, a content certificate (CC) indicative of the authenticity of the content, and am MKB (Media Key Block) that is an encrypted key block storing key information (media key) for getting a CPS unit key.

The encrypted content 114 is encrypted content compliant with the AACS standard for example. For example, the encrypted content 114 is content composed of an AV (Audio Visual) stream such as HD (High Definition) movie content that is high-definition moving image data, music data, a game program, an image file, audio data, and text data, for example.

The encrypted content 114 is encrypted content having a configuration in which usage management on a content management unit (CPS unit) basis for example to which different unit keys (CPS unit keys) for different content management units are applied. The key different from unit to unit is allocated, encrypted, and stored.

The information processing apparatus 120 has two data processing blocks.

A first data processing block is a BD-JVM (a BD-J virtual machine) 121. The BD-JVM 121 is set as a virtual machine as a virtual hardware environment for executing the BD-J application 111 recorded to the disc 110.

A second data processing block is an AACS layer 122. The AACS layer 122 is set as a data processing block for executing the handling of high-security information, such as the acquisition of the ID recorded to the disc 110, and the data processing compliant with the AACS standard, such as the data conversion in content copy processing, for example.

Thus, in executing the processing of copying content recorded to the disc 110 to another media, the BD-JVM 121 as an execution area of the BD-J application 111 recorded to the disc 110 and the AACS layer 122 that is a program execution area for executing the processing compliant with the AACS standard are set, thereby executing mutual processing requests and processing result transfer, for example.

API (Application Programming Interface) is used for these mutual processing requests and processing result transfer between the BD-J application and the AACS layer. API is a set of functions and so on for executing various kinds of processing necessary for the execution of content copy processing. API is recoded in the BD-J application 111 or in an area that the information processing apparatus 120 is able to read. Specific examples of API will be described in detail later.

The information processing apparatus 120 executes the BD-J application 111 in the BD-JVM 121 to make communication with the management server 140, thereby executing the processing of getting copy permission information 132 (Permission), for example.

In copying the encrypted content 114 stored in the disc 110 to the second recording media 150, the processing, such as converting the content and the usage control information (Usage Rules) so that they become compatible with the destination recording media. These processing operations are executed in a program execution area (the AACS layer 122) in which AACS-compliant processing operations are executed.

The BD-J application 111 is a program for executing the processing necessary for the execution of content copy processing and is executed in the BD-JVM 121 of the information processing apparatus 120. For the processing with the BD-J application applied, the following processing for example is executed:

(a) server access processing by use of the URI of a copy processing management file;

(b) acquisition of a permission processing list from the server;

(c) transmission of processing select information to the server by the user;

(d) account settlement processing;

(e) acquisition of copy permission information from the server, check processing, outputting of the copy permission information to the recording control block;

(f) monitoring the content copy processing executed by the recording control block; and (g) monitoring the writing of data downloaded from the server executed by the recording control block.

These processing operations are executed by applying the BD-J application.

It should be noted that, as described above, the BD-J application 111 is may be configured as a single application or a combination of two or more BD-J applications for executing particular processing. For example, the above-mentioned processing operations (a) through (g) may be executed by two or more BD-J applications.

The following describes the processing by the BD-J application with reference to FIG. 2. The BD-J application is started, in step S101 shown in FIG. 2, in the BD-JVM 121 that is set to the information processing apparatus 120.

It should be noted that, in the execution of this processing, a guide screen as a user interface is presented on a display device of the information processing apparatus 120, the guide screen being a menu provided by the BD-J application. Thus, a sequence of processing operations for executing content copy processing is started in accordance with a user instruction.

As instructed by the user, the BD-J application first applies the server URI included in the copy processing management file 112 to access the management server 140. In this operation, the content ID corresponding to the content subject to copy is transmitted to the management server 140.

In step S102, the management server 140 generates a permission processing list that is list data of processing operations permitted for that content on the basis of the content ID received from the information processing apparatus 120 and transmits the generated list to the information processing apparatus 120. For example, this list is composed of the information indicative whether content copy is permitted or not and the information about the fee of copy processing, for example.

The information processing apparatus 120 receives the permission processing list 123 from the management server 140 and, in step S103, shows the permission processing list on the display for the user to select a processing operation to be executed.

When a processing operation to be executed is selected by the user, the information processing apparatus 120 executes settlement processing by transferring settlement data 131 with the management server 140. For example, the user enters the data necessary for the settlement, such as a credit card number for example, through a settlement screen and transmits the entered data. Next, in step S104, the management server 140 permits the processing and transmits the copy permission information to the information processing apparatus 120.

The information processing apparatus 120 passes the copy permission information received from the management server 140 to the AACS layer 122. In the AACS layer 122, the processing operations of steps S105 and the subsequent steps are executed. The AACS layer 122 executes the processing of converting the management data 113 read from the disc 110 into the management data corresponding to the media type of the second information recording media 150, such as a hard disk drive, an R/RE disc, or a flash memory, for example, that is the copy destination. For example, the AACS layer 122 executes the processing of adding an encryption key (unit key) corresponding to the copy content and converting the usage control information and content certificate and the like, into the data corresponding to the copy content. The information necessary for these data conversion operations is included in copy permission information 124. The converted management data 151 is recorded to the second information recording media 150.

Further, in step S106, the information processing apparatus 120 enters the encrypted content 114 recorded to the disc 110 and outputs the content copy data with the data conversion such as format conversion executed. Thus, the copy data recorded to the disc 110 is recorded to the second information recording media 150 as encrypted content 152. It should be noted that the management data 151 to be recorded to the second information recording media 150 is composed of the usage control information, the content certificate, the MKB, the CPS unit key file, and the token that correspond to the content to be recorded to the second information recording media 150.

It should be noted that, in the content copy processing, the media identifier (or the serial number) of the second information recording media 150 is checked between the information processing apparatus 120 and the management server 140 and a token is generated by the signature processing based on a secret key of the management server 140 for the media identifier, thereby sometimes including the generated token in the management data, for example. The management data made up of this token and so on is shown as management data 141 inside the management server 140 in FIG. 2. The management data (CP data) 151 to be recorded to the second information recording media 150 may include this token information.

Thus, the content copy processing has been outlined above with reference to FIG. 2. As described above, the content copy processing is executed by use of the BD-J application and the program that is executed on the AACS layer.

Therefore, it is required to transfer necessary information between the BD-J application and the execution program of the AACS layer. API is applied to this processing. The following describes an example of API between the BD-J application and the AACS layer to be used in the content copy processing with reference to FIG. 3A and FIG. 3B.

Figure 3A:
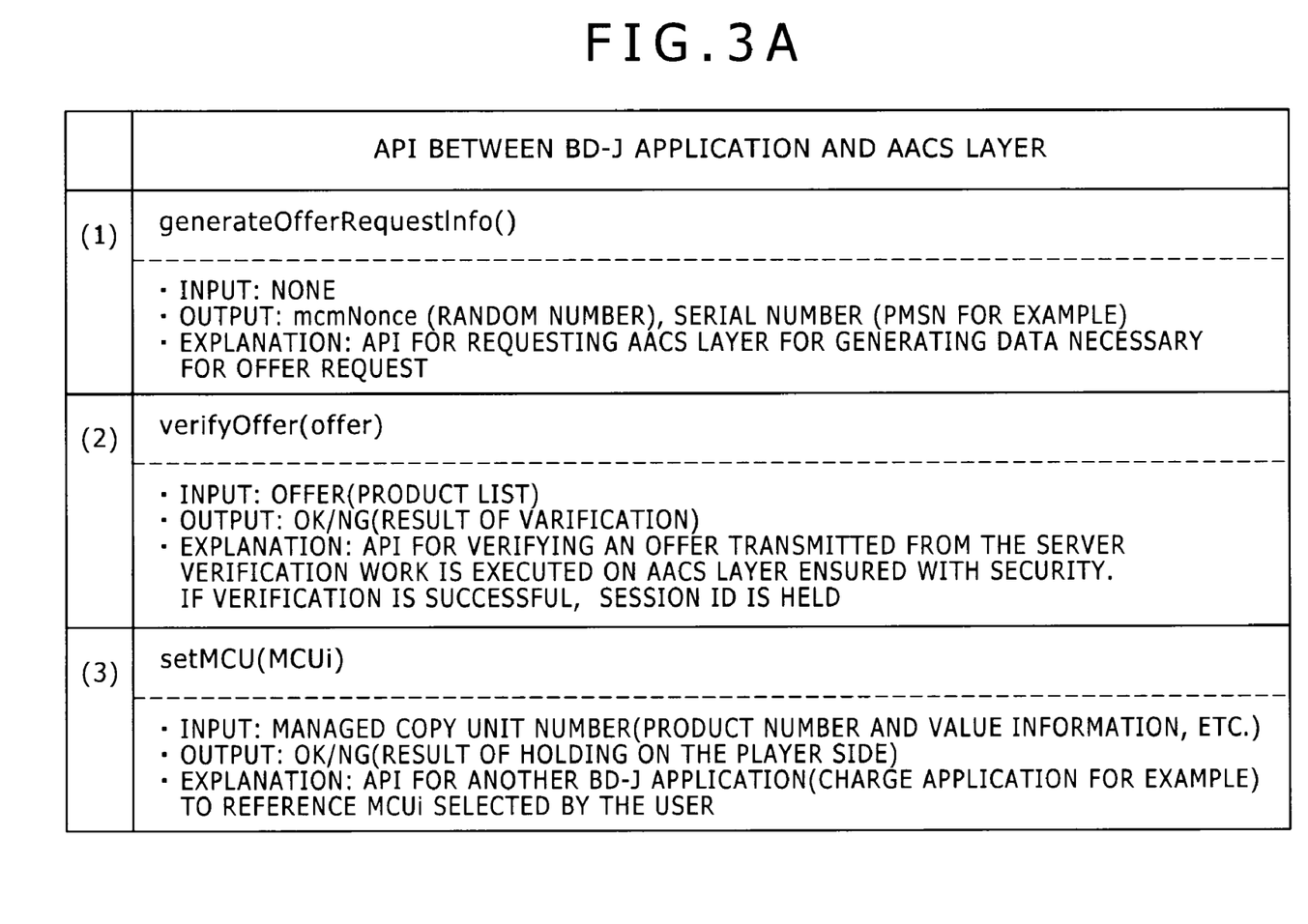
FIG. 3A shows a diagram for describing Application Programming Interface to be applied to the content copy processing associated with one embodiment of the invention and FIG. 3B shows a diagram for describing Application Programming Interface to be applied to the content copy processing associated with one embodiment of the invention.
Figure 3B:
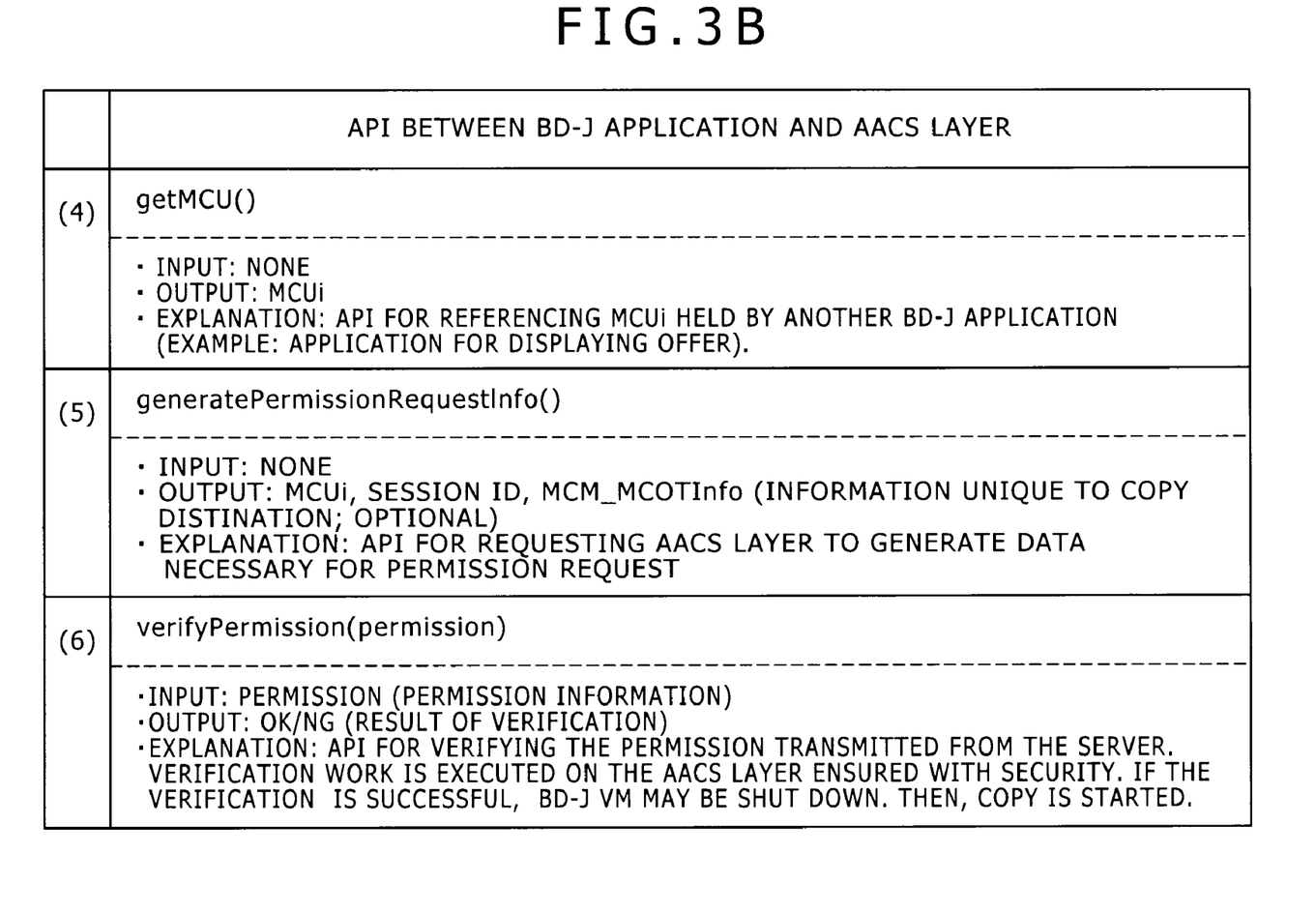

The APIs between the BD-J application and the AACS layer to be used in the content copy processing are as follows.

(1) GenerateOfferRequestInfo( )

This API specifies the processing of requesting the AACS layer for the data to be transmitted to the management server 140 and receiving the request data when the BD-J application requests the management server 140 for transmitting a permission processing list (Offer) corresponding to the content.

The input from the BD-J application to the AACS layer and the output from the AACS layer to the BD-J application in the processing using this API are as follows.

Input from the BD-J application to the AACS layer: none.

Output from the AACS layer to the BD-J application: random number (mcmNonce), media ID (Serial Number) made up of PMSN, for example.

(2) VerifyOffer(Offer)

This API specifies the processing in which the BD-J application requests the AACS layer for verifying a permission processing list (Offer) received from the management server 140 and receives a result of the verification. The verification work is executed on the AACS layer with security ensured. If the verification is successful, the session ID is retained.

The input from the BD-J application into the AACS layer and the output from the AACS layer to the BD-J application in the processing using this API are as follows.

Input: permission processing list (Offer).

Output: OK/NG (result of verification processing (Verification)).

(3) SetMCU(MCUi)

This API specifies the processing in which one BD-J application presents, to another BD-J application (an application for executing charging processing for example), the production identification information such as the identifier of a product subject to copy (MCUi) selected by the user.

The input from the BD-J application into the AACS layer and the output from the AACS layer to the BD-J application in the processing using this API are as follows.

Input: Managed Copy Unit number (product identifier (MCUi) and price information as necessary for example).

Output: OK/NG (a result of checking whether the information has been held in a memory area in the information processing apparatus).

(4) GetMCU( )

This API specifies the processing in which the user selection information (for example, identifier of product subject to copy (MCUi)) held in one BD-J application (for example, a permission processing list (Offer) is presented to another BD-J application.

The input from the BD-J application into the AACS layer and the output from the AACS layer to the BD-J application in the processing using this API are as follows.

Input: none

Output: identifier of product subject to copy (MCUi)

(5) GeneratePermissionRequestInfo( )

This API specifies the processing in which the BD-J application requests the AACS layer for the data to be transmitted to the management server 140 in order to get copy permission information (Permission) from the management server 140 and receives the requested information.

The input from the BD-J application into the AACS layer and the output from the AACS layer to the BD-J application in the processing using this API are as follows.

Input: none

Output: identifier of product subject to copy (MCUi), session ID (session id), copy destination media information (MCM_MCOTInfo (option)).

(6) VerifyPermission(Permission)

This API specifies the processing in which the BD-J application requests the AACS layer for the verification of the copy permission information (Permission) received from the management server 140 and receives a result of the verification.

The input from the BD-J application into the AACS layer and the output from the AACS layer to the BD-J application in the processing using this API are as follows.

Input: copy permission information (Permission).

Output: OK/NG (result of verification (Verification)).

The verification work is executed on the AACS layer with security ensured. It should be noted that, if the verification is successful, the content copy processing is ready for execution, upon which the processing of BD-J application may be ended, thereby shutting down the BD-JVM at this point of time. Then, the content copy processing starts.

Thus, between the BD-J application and the execution program of the AACS layer, the transfer of necessary information is smoothly executed by the API, so that the managed copy processing can be executed under the initiative of the BD-J application.

The following describes sequences of the content copy processing using the API to be executed in the information processing apparatus 120, with reference to the flowcharts shown in FIG. 4 to FIG. 7.

Figure 4:
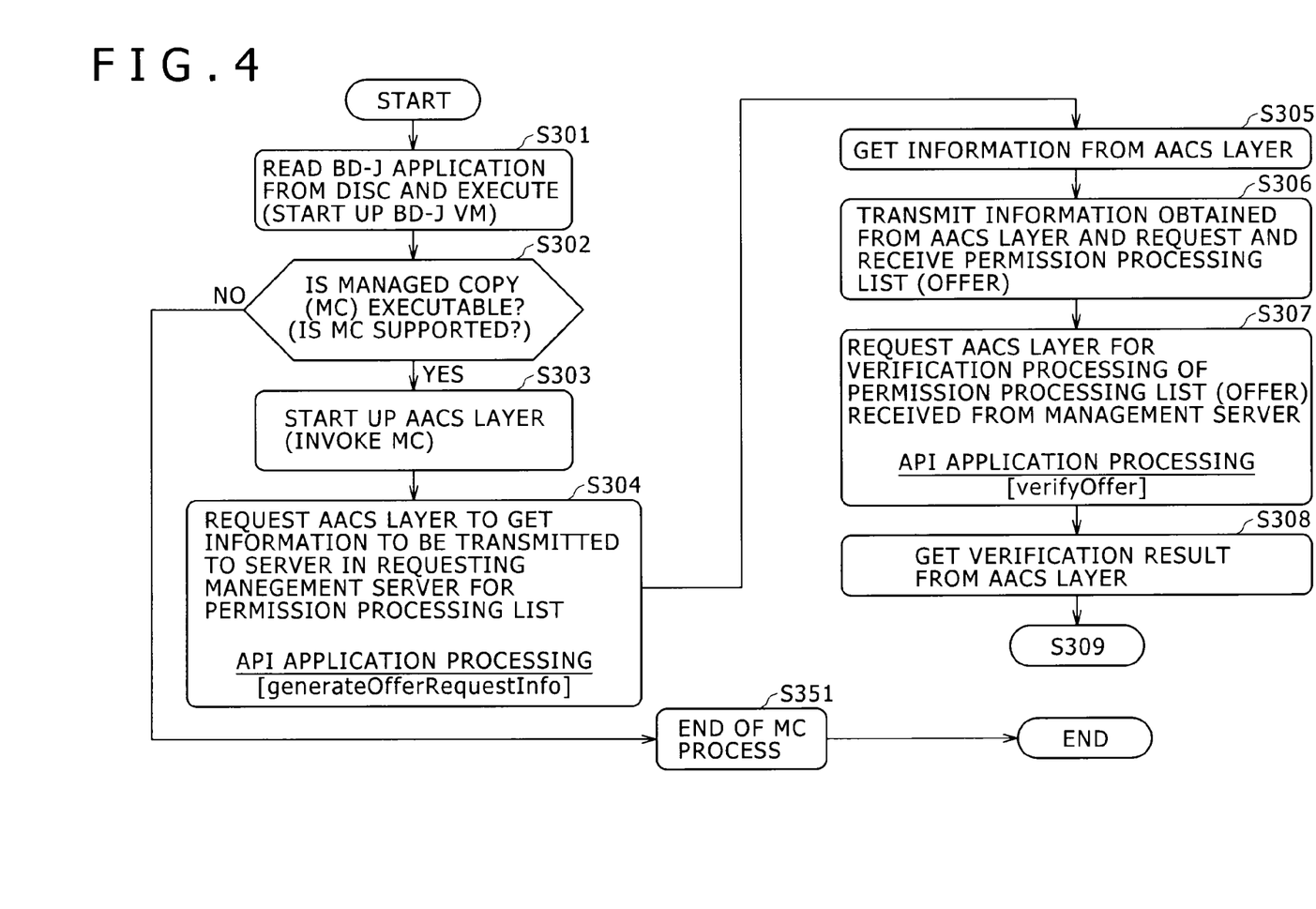
FIG. 4 is a flowchart indicative of a content copy processing sequence associated with one embodiment of the invention.

First, after loading a disc recorded with the content subject to copy and a BD-J application onto the information processing apparatus to set the disc in a reproducible state, the information processing apparatus reads the BD-J application recorded to the disc to start the execution of the BD-J application in step S301. It should be noted that, in starting this processing, the information processing apparatus invokes the BD-JVM (the BD-JVM 121 shown in FIG. 2) that is the execution block of the BD-J application. The BD-J application is executed in the BD-JVM.

As described above with reference to FIG. 2, the BD-JVM 121 is a virtual machine as virtual hardware environment for executing the BD-J application 111 recorded to the disc 110.

The processing operations subsequent to step S302 are executed following the sequence recorded to the BD-J application program recorded to the disc. However, some steps are executed on the AACS layer.

In step S302, it is determined whether the information processing apparatus can execute managed copy or not. To be more specific, it is determined whether the information processing apparatus is a device certified by AACS. The BD-J application device confirmation processing is executed in accordance with a predetermined sequence set in advance to determine whether own apparatus is a device certified by AACS and a device for which managed copy is permitted.

If own apparatus is found not to be a device for which managed copy is permitted, then the processing operations of step S303 and the subsequent steps are stopped. Namely, the procedure goes to step S351, in which managed copy processing is stopped to end the processing.

If own apparatus is found to be a device for which managed copy is permitted, then the procedure goes to step S303. In step S303, the AACS layer (the AACS layer 122 shown in FIG. 2) is invoked. As described above, the AACS layer is the execution layer of managed programs specified by AACS and is set to the information processing apparatus as a layer on which secure data necessary for managed copy is provided and copy data conversion processing is executed.

After invoking the AACS layer, the procedure goes to step S304. In step S304, the AACS layer is requested for the information to be transmitted to the management server 140 in requesting a permission processing list (the permission processing list 123 shown in FIG. 2) for the management server (the management server 140 shown in FIG. 2). Namely, the BD-J application requests the AACS layer for the processing.

This processing request is executed as the processing with API applied. This API is [generateOfferRequestInfo( )] shown in FIG. 3A.

This API, as described above, specifies the processing of requesting the AACS layer for the data to be transmitted to the management server 140 and receiving the request data when the BD-J application requests the management server 140 for transmitting a permission processing list (Offer) corresponding to the content. The input from the BD-J application into the AACS layer is [none]. The output from the AACS layer to the BD-J application is [random number (mcmNonce), media ID (Serial Number)].

In step S305, the BD-J application gets, from the AACS layer, the information generated or obtained by the AACS layer by the API application processing in step S304, namely, "random number (mcmNonce), media ID (Serial Number)."

Next, in step S306, the BD-J application transmits the information "random number (mcmNonce), media ID (Serial Number)" obtained from the AACS layer to the management server 140 and makes a transmission request for the permission processing list (Offer) to receive the permission processing list (Offer) from the management server 140.

In step S307, the BD-J application requests the AACS layer for the verification of the permission processing list (Offer) received from the management server 140. Namely, the BD-J application requests the AACS layer to verify whether the permission processing list (Offer) is an authorized, unaltered list issued by the management server 140. Namely, the BD-J application requests the AACS layer to execute this processing.

This request for processing is executed as the processing with API applied. This API is [verifyOffer] shown in FIG. 3A.

This API, as described above, specifies the processing in which the BD-J application requests the AACS layer for verifying the permission processing list (Offer) received from the management server 140 and receives a result of the verification. The verification work is executed on the AACS layer with security ensured. If the verification is successful, the session ID is retained.

The input from the BD-J application into the AACS layer in the processing using this API is [permission processing list]. The output from the AACS layer to the BD-J application is [OK/NG (result of verification)].

Figure 5:
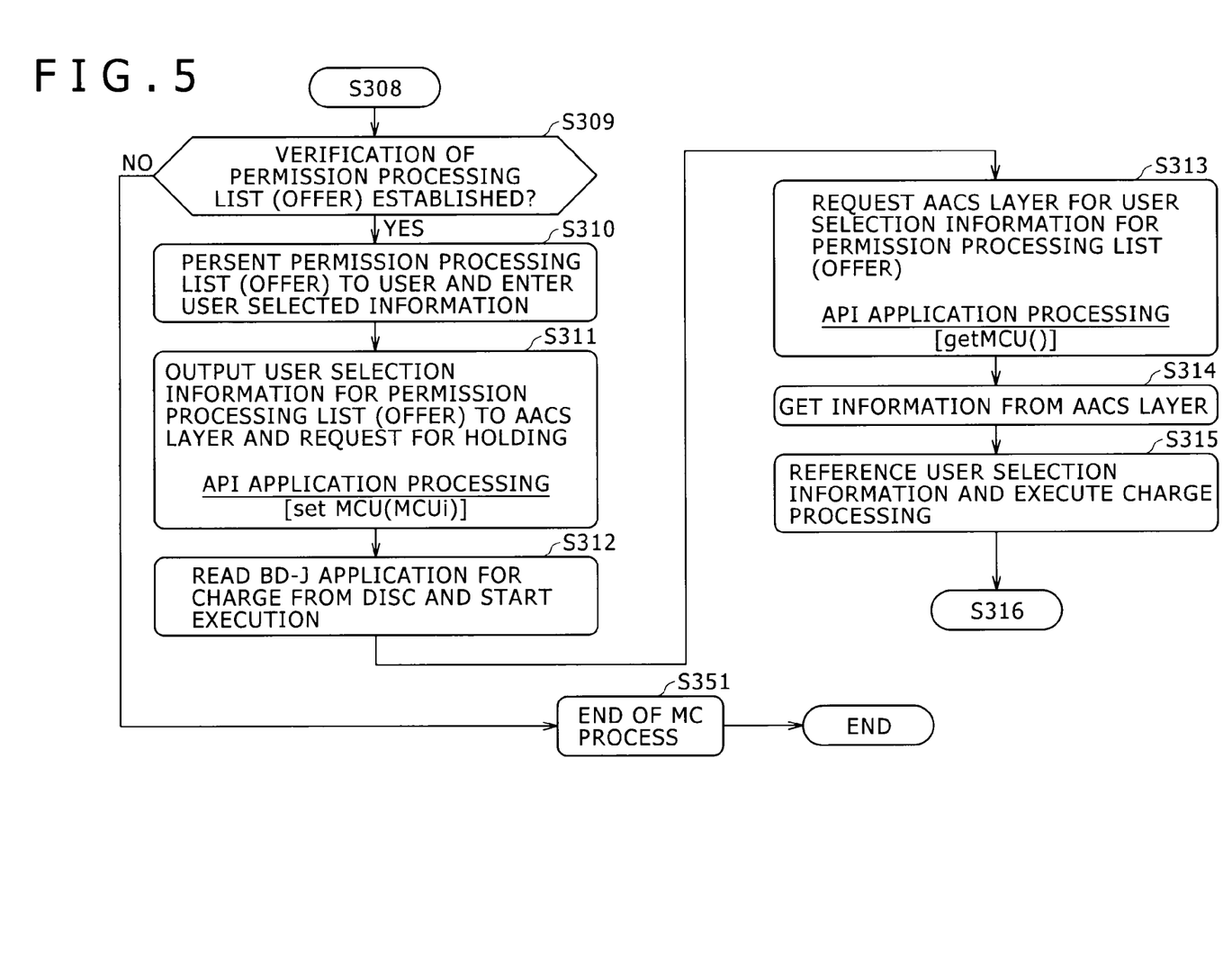
FIG. 5 is a flowchart continued from the flowchart shown in FIG. 4.

In step S308, a result of the verification processing (Verification) executed on the permission processing list (Offer) by the AACS layer in the API application processing in step S307 is obtained. Namely, the BD-J application gets an [OK/NG] verification result from the AACS layer.

In step S309, the BD-J application references the result of the verification processing (Verification) of the permission processing list received from the AACS layer and, if the verification is found unsuccessful (NG), stops the processing. Namely, the procedure goes to step S351 to stop the managed copy, upon which the processing ends.

On the other hand, if the result of the verification processing of the permission processing list obtained from the AACS layer is found successful (OK) in step S309, then the procedure goes to step S310.

In step S310, the BD-J application presents the authorized permission processing list to the user via the display or the like to make the user enter selection information. The permission processing list is a list of content subject to managed copy. For example, this is a list containing price information by which the user can select the content to be copied by the user from among two or more pieces of copy permitted content.

Next, in step S311, the BD-J application outputs the user selection information for the permission processing list to the AACS layer to retain the selection information in the management memory of the AACS layer. This processing is also executed as API application processing.

The API to be applied to this processing is [setMCU(MCUi)] shown in FIG. 3A.

As described above, this API specifies the processing in which one BD-J application presents product identification information such as the identifier of product subject to copy (MCUi) selected by the user to another BD-J application (for example, an application for executing charging processing).

The input from the BD-J application using this API to the AACS layer is [Managed Copy Unit number and so on (product identifier (MCUi) and price information and so on as required)]. The output from the AACS layer to the BD-J application is [OK/NG (a result of checking whether the information has been held in a memory area in the information processing apparatus)].

Next, the procedure goes to step S312. In step S312, the BD-J application to be applied to charging processing is read from the disc and the execution is started in the BD-JVM. It should be noted that this flow is an example in which the application for executing charging processing is set as an independent BD-J application. Applications may be set in a variety of ways; all processing operations may be executed by a single BD-J application or each processing operation may be executed by a discrete BD-J application.

In this processing example, a BD-J application for executing a sequence of processing other than charging processing and a BD-J application dedicated to charging processing are selectively executed in BD-JVM. Charging processing is executed by the BD-J application dedicated to charging processing. In step S312, the execution of this charging processing BD-J application is started in BD-JVM.

Next, in step S313, the BD-J application for charging processing requests the AACS layer for the provision of user selection information.

This processing request is executed as the processing with API applied. This API is [getMCU( )] shown in FIG. 3B.

As described above, this API specifies the processing in which the user selection information (for example, the identifier of product subject to copy (MCUi)) held in one BD-J application (for example, an application for presenting the permission processing list (Offer)) is presented to another BD-J application, the BD-J application dedicated to charging processing in this example.

The input from the BD-J application into the AACS layer in the processing using this API is [None]. The output from the AACS layer to the BD-J application is [identifier of product subject to copy (MCUi) and price information and so on as required].

Figure 6:
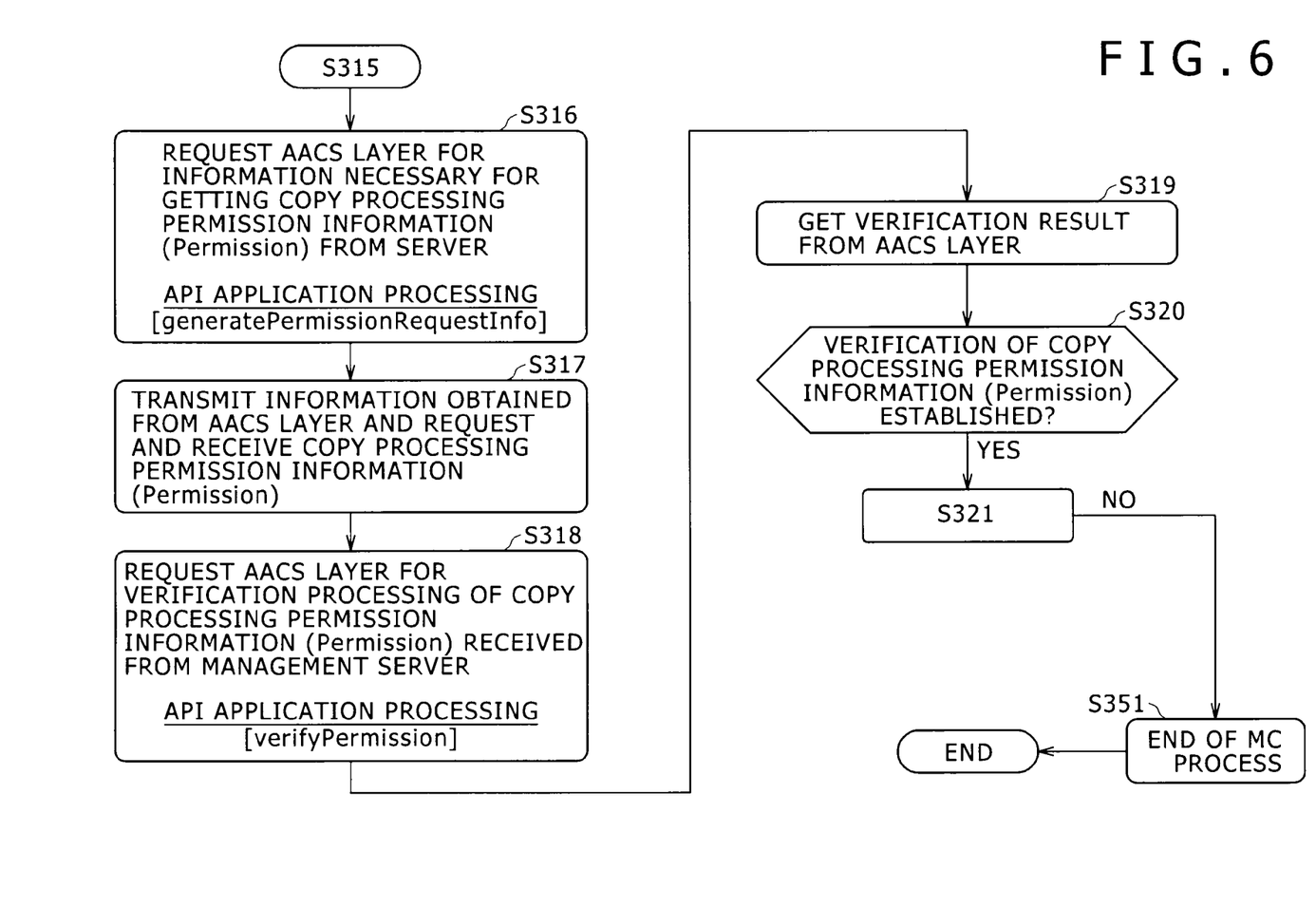
FIG. 6 is a flowchart continued from the flowchart shown in FIG. 5.

In step S314, the BD-J application for executing charging processing gets [identifier of product subject to copy (MCUi) and price information and so on as required] from the AACS layer.

In step S315, the BD-J application for executing charging processing executes the charging processing by applying the information [identifier of product subject to copy (MCUi) and price information and so on as required] obtained from the AACS layer. The information processing apparatus is connected to a server for executing charging processing other than the management server 140 shown in FIG. 2 and executes the charging processing in accordance with a predetermined sequence. This server connection processing and the settlement processing are executed by the BD-J application dedicated to charging processing. It should be noted that the settlement data generated by this charging processing is transmitted to the management server 140 as indicated by the settlement data 131 shown in FIG. 2. The management server 140 makes a confirmation of the completion of the settlement processing.

When the charging processing has been completed in step S315, the processing of the BD-J application for executing charging processing ends. The processing operations of steps S316 and the subsequent steps are executed by the BD-J application for executing a sequence of processing other than the charging processing.

In step S316, in order to get copy permission information (Permission) from the management server, the BD-J application requests the AACS layer for getting the information to be transmitted to the management server 140 from the AACS layer.

This processing request is executed as the processing with API applied. This API is [generatePermissionRequestInfo( )] shown in FIG. 3B.

This API, as described above, specifies the processing in which, in order to get copy permission information (Permission) from the management server 140, the BD-J application requests the AACS layer for the data to be transmitted to the management server 140 and receives the requested data. The input from the BD-J application into the AACS layer in the processing using this API is [None]. The output from the AACS layer to the BD-J application is [identifier of program subject to copy (MCUi), session ID (session id), copy destination media information (MCM_MCOTInfo (option))].

In step S317, the BD-J application transmits the information obtained from the AACS layer to the management server 140 to make a request for getting copy permission information (Permission).

Namely, in requesting for the acquisition of copy permission information (Permission), the BD-J application transmits the information [identifier of program subject to copy (MCUi), session ID (session id), copy destination media information (MCM_MCOTInfo (option))] obtained from the AACS layer to the management server 140 to make a request for the acquisition of copy permission information (Permission). Then, the BD-J application receives the copy permission information (Permission) from the management server 140.

Next, in step S318, the BD-J application requests the AACS layer for the verification processing of the copy permission information (Permission) obtained from the management server 140. Namely, the BD-J application requests the AACS layer for the verification whether the copy permission information (Permission) is an authorized, unaltered list issued by the management server 140.

This processing request is executed as the processing with API applied. This API is [verifyPermission] shown in FIG. 3B.

This API, as described above, specifies the processing in which the BD-J application requests the AACS layer for the verification of the copy permission information (Permission) received from the management server and receives a result of the verification. The input from the BD-J application into the AACS layer in the processing using this API is [copy permission information (Permission)]. The output from the AACS layer to the BD-J application is [OK/NG (result of verification (Verification))].

Figure 7:
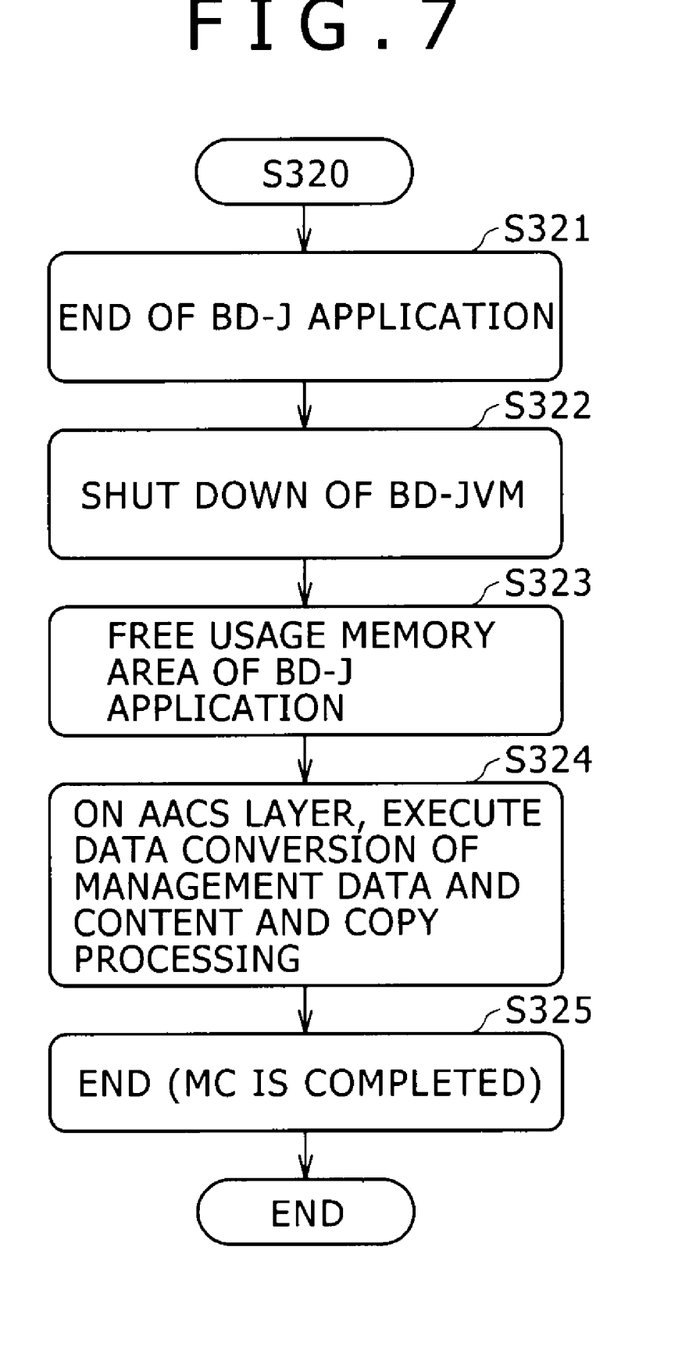
FIG. 7 is a flowchart continued from the flowchart shown in FIG. 6.

In step S319, a result of the verification processing (Verification) of the copy permission information (Permission) executed by the AACS layer by the API application processing in step S318 is obtained. Namely, the BD-J application gets a result of the verification [OK/NG] from the AACS layer.

In step S320, the BD-J application references the result of the verification processing of the copy permission information obtained from the AACS layer and, if the verification is found unsuccessful (NG), stops the processing. Namely, the procedure goes to step S351 to stop the managed copy, upon which the processing ends.

On the other hand, if the verification processing of the copy permission information obtained from the AACS layer is found successful (OK) in step S320, then the procedure goes to step S321.

In step S321, the BD-J application is ended. The subsequent processing is executed on the AACS layer, so that the BD-J application is ended.

Next, in step S322, upon the end of the BD-J application, the BD-JVM (the BD-J virtual machine) set as the execution block of the BD-J application is shut down.

Next, in step S323, upon the end of the BD-J application, the memory area used by the BD-J application, namely, the memory area in the information processing apparatus 120, is freed.

In step S324, in the AACS layer, management data and content recorded to a disc are read, data conversion processing in accordance with the media of he copy destination is executed, and copy data is recorded to the media of the copy destination.

This processing uses the memory area in the information processing apparatus freed in step S323. In this processing example, before the data conversion and copy processing on the AACS layer start, the BD-J application is ended to free the memory area used by the BD-J application and then the processing on the AACS layer is executed.

Thus, by preventing the processing of the BD-J application and the processing of the AACS layer from being competed, the efficient processing effectively using the limited memory area in the information processing apparatus 120 becomes practicable. As a result, the data conversion and copy processing on the AACS layer are increased in processing speed.

When the data conversion and copy processing by the AACS layer in step S324 have been completed, the procedure goes to step S325 to end managed copy.

In the information processing apparatus practiced as one embodiment of the present invention, as shown in flowcharts of FIGS. 4 to 7, the BD-J application executed in the BD-JVM initiatively executes the managed copy processing of content. However, the following processing operations may not be handled in the BD-J application, so that these processing operations are executed on the AACS layer that executes programs to be created under the control of the AACS:

generation and acquisition of data to be transmitted to the management server;

verification processing of the data acquired from the management server; and conversion and copy recording processing of content and management data.

If an enough memory areas cannot be allocated in the information processing apparatus in executing the data conversion and copy processing on the AACS layer, the processing takes long time. The processing of the BD-J application is also executed as the processing with the virtual machine as a virtual hardware configuration set, thereby requiring the use of a large memory area in the information processing apparatus. Therefore, if a memory area large enough this processing cannot be allocated, the processing may be delayed.

As described above, if the setting is made so that the data conversion and copy processing on the AACS layer and the processing of the BD-J application are executed in parallel, each processing is lowered in processing speed and therefore the efficient processing may not be achieved.

However, in the embodiments of the present invention, the data conversion and copy processing on the AACS layer are started in step S324 after the end and shutdown of the BD-J application in steps S321 through S323 of the flowchart and the freeing of the memory area.

Namely, the BD-J application that is the data processing program recorded to a disc is set as a program defined with a sequence described with reference to the flowcharts shown in FIGS. 4 through 7. Following this sequence allows the acquisition of copy permission information from the management server first on the virtual machine as a virtual hardware environment, the virtual machine being shut down after the completion of the acquisition of the copy permission information. Then, in the AACS layer, the content recorded to a disc can be data converted to be copied to another recording media.

Namely, the BD-J application that is a data processing program recorded to a disc is a Java (registered trademark) application program set as a program for shutting down the virtual machine after the end of predetermined processing to free the memory area in the information processing apparatus for the data processing block that executes data conversion or the copy recording processing.

Executing the processing by following the above-mentioned sequence allows both the data conversion and copy processing on the AACS layer and the processing of the BD-J application to use a memory area large enough for the processing, thereby efficiently executing both the processing at high speeds without causing delay.

While preferred embodiments of the present invention have been described using specific terms, such description is for illustrative purpose only, and it is to be understood that changes and variations may be made without departing from the spirit or scope of the following claims.

The above-mentioned sequence of processing operations may be executed by software, hardware, or both. When the above-mentioned sequence of processing operations is executed by software, the programs constituting the software are installed in a computer which is built in dedicated hardware equipment or installed into a general-purpose personal computer for example in which various programs may be installed for the execution of various functions. For example, programs can be recorded to recording media in advance. In addition to the installation of programs from the recording media onto the computer, programs can be downloaded via a network such as LAN (Local Area Network) or the Internet into recording media such as an incorporated hard disk drive or the like.

It should be noted herein that the steps for describing each program recorded in recording media include not only the processing operations which are sequentially executed in a time-dependent manner but also the processing operations which are executed concurrently or discretely. Also, it should also be noted that term "system" as used herein denotes a logical set of a plurality of component units and these component units are not necessarily accommodated in a same housing.

As described above and according to the configurations of embodiments of the present invention, in executing the content copy processing between media in an information processing apparatus, processing sequences in a first data processing block for executing processing operations such as acquiring copy permission information from a server and a second data processing block for executing data conversion and copy recording processing involved in content copy processing are set with the use of resources of the information processing apparatus taken into consideration. To be more specific, after the completion of the processing in the first data processing block for executing processing operations such as acquiring copy permission information from a server, a virtual machine configuring the first data processing block is shut down to free a memory area and then data conversion and copy recording processing are started in the second data processing block. This novel setting allows the first data processing block and the second data processing block to allocate a memory area large enough for the execution of various data processing operations, thereby realizing efficient processing without causing delay.

The present application contains subject matter related to that disclosed in Japanese Priority Patent Application JP 2008-169278 filed in the Japan Patent Office on Jun. 27, 2008, the entire content of which is hereby incorporated by reference.

What is claimed is:

1. An information processing apparatus comprising:
a first data processing block configured by a virtual machine as a virtual hardware environment for executing a program read from a first recording media recording content and said program for executing data processing; and
a second data processing block configured to execute data conversion of said content and copy processing of the converted content onto a second recording media, wherein
said first data processing block executes acquisition of copy permission information from a management server by execution of said program and shuts down said virtual machine after completion of the acquisition of said copy permission information from said management server, and
said second data processing block is configured to execute data conversion of content recorded to said first recording media after said virtual machine is shut down, and to execute copy processing of the converted content onto the second recording media after said virtual machine is shut down.

2. The information processing apparatus according to claim 1, wherein said first data processing block frees a memory area of said information processing apparatus after shutting down said virtual machine and
said second data processing block executes data conversion of said content recorded to said first recording media and copy processing of the converted content onto said second recording media by use of the memory area of said information processing apparatus freed by said first data processing block.

3. The information processing apparatus according to claim 1, wherein said first data processing block executes data processing on a Java (registered trademark)—VM (Virtual Machine) that is a virtual machine as a virtual hardware environment for executing a Java (registered trademark) application program.

4. The information processing apparatus according to claim 1, wherein said first data processing block acquires data necessary for requesting copy permission information from said second data processing block and transmits the acquired data to said management server.

5. The information processing apparatus according to claim 1, wherein said first data processing block executes processing of requesting said second data processing block for verifying copy permission information acquired from said management server, and, after receiving a response indicative of successful verification, shuts down said virtual machine.

6. The information processing apparatus according to claim 1, wherein said first data processing block requests said second data processing block for data necessary for requesting copy permission information.

7. The information processing apparatus according to claim 1, wherein said first data processing block requests said second data processing block for processing by applying an API (Application Programming Interface) defined with processing to be executed.

8. A non-transitory information recording media recording content and a program for data processing as recorded data, wherein said program is executed on a virtual machine as a virtual hardware environment in an information processing apparatus to shut down said virtual machine before data conversion and copy recording processing of said content, to make a data processing block for executing the data conversion and the copy recording processing free a memory area in said information processing apparatus.

9. The non-transitory information recording media according to claim 8, wherein said program is a Java (registered trademark) application program.

10. A data processing method that is executed in an information processing apparatus, comprising the steps of:

executing, by a first data processing block, a program read from a first recording media recording content and said program for executing data processing on a virtual machine as a virtual hardware environment for executing, acquiring copy permission information from a management server, and shutting down said virtual machine after completion of acquisition processing of said copy permission information from said management server; and executing, by a second data processing block, data conversion of content recorded to said first recording media after said virtual machine is shut down, and executing, by the second data processing block, copy processing of the converted content onto a second recording media after said virtual machine is shut down.

11. A non-transitory computer-readable storage medium including computer executable instructions, wherein the instructions, when executed by an information processing apparatus, cause the information processing apparatus to perform a method, the method comprising the steps of:

acquiring, in a virtual machine as a virtual hardware environment, copy permission information from a management server and shutting down said virtual machine after completion of acquisition of said copy permission information from said management server; and executing, in a data processing block, after shutting down of said virtual machine, data conversion of content recorded to a first recording media, and executing, in the data processing block, after shutting down of said virtual machine, copy processing of the converted content onto a second recording media.

12. An information processing apparatus comprising:

first data processing means configured by a virtual machine as a virtual hardware environment for executing a program read from a first recording media recording content and said program for executing data processing; and second data processing means for executing data conversion of said content and copy processing of the converted content onto a second recording media, wherein said first data processing means executes acquisition of copy permission information from a management server by execution of said program and shuts down said virtual machine after completion of the acquisition of said copy permission information from said management server, and said second data processing means executes data conversion of content recorded to said first recording media after said virtual machine is shut down, and executes copy processing of the converted content onto the second recording media after said virtual machine is shut down.

* * * * *